(12) United States Patent
Harris et al.

(10) Patent No.: US 12,039,661 B2
(45) Date of Patent: Jul. 16, 2024

(54) PARAMETERIZED GENERATION OF TWO-DIMENSIONAL IMAGES FROM A THREE-DIMENSIONAL MODEL

(71) Applicant: Apple Inc., Cupertino, CA (US)

(72) Inventors: Jeffrey D. Harris, Berkeley, CA (US); Amaury Balliet, Chatillon (FR); Remi G. Santos, Cupertino, CA (US); Jason D. Rickwald, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/889,701

(22) Filed: Jun. 1, 2020

(65) Prior Publication Data

US 2020/0380768 A1 Dec. 3, 2020

Related U.S. Application Data

(60) Provisional application No. 62/856,139, filed on Jun. 2, 2019.

(51) Int. Cl.
*G06T 15/20* (2011.01)
*G06T 19/20* (2011.01)
*G06V 40/16* (2022.01)

(52) U.S. Cl.
CPC ............ *G06T 15/205* (2013.01); *G06T 19/20* (2013.01); *G06V 40/166* (2022.01);
(Continued)

(58) Field of Classification Search
None
See application file for complete search history.

(56) References Cited

U.S. PATENT DOCUMENTS 8,674,998 B1 * 3/2014 Schnitzer ............... G11B 27/34
345/475
2012/0079377 A1 * 3/2012 Goossens ............ G06F 3/04815
715/706

(Continued)

OTHER PUBLICATIONS

Bouaziz, Sofien, Yangang Wang, and Mark Pauly. "Online modeling for realtime facial animation." ACM Transactions on Graphics (ToG) 32.4 (2013): 1-10.*

(Continued)

*Primary Examiner* — Yingchun He
(74) *Attorney, Agent, or Firm* — BAKERHOSTETLER

(57) ABSTRACT

A device for performing parameterized generation of two-dimensional images from a three-dimensional model may include at least one processor configured to receive a set of parameters for generating a two-dimensional image from a three-dimensional model. The at least one processor may be further configured to position a render camera relative to the three-dimensional model based at least in part on a first parameter of the set of parameters, apply a pose to the three-dimensional model based at least in part on a second parameter of the set of parameters, and add at least one supplemental content item to the posed three-dimensional model based at least in part on a third parameter of the set of parameters. The at least one processor may be further configured to generate, using the positioned render camera, the two-dimensional image from the posed three-dimensional model including the added at least one supplemental content item.

20 Claims, 9 Drawing Sheets

(52) U.S. Cl.
CPC .. *G06V 40/174* (2022.01); *G06T 2207/10028* (2013.01); *G06T 2207/30201* (2013.01)

(56) References Cited

U.S. PATENT DOCUMENTS

| | | | | |
|---|---|---|---|---|
| 2012/0079378 A1* | 3/2012 | Goossens | ............ | G06F 3/04815 |
| | | | | 715/706 |
| 2016/0021041 A1* | 1/2016 | Zacharias | ............... | H04L 51/10 |
| | | | | 709/203 |
| 2016/0026253 A1* | 1/2016 | Bradski | ................ | H04N 13/344 |
| | | | | 345/8 |
| 2019/0235856 A1* | 8/2019 | Zhang | ................... | G06F 21/602 |

OTHER PUBLICATIONS

Academic Kids, "Rendering (computer graphics)", archived Mar. 20, 2013 from https://web.archive.org/web/20130320232833/https://academickids.com/encyclopedia/index.php/Rendering_(computer_graphics).*

* cited by examiner

PARAMETERIZED GENERATION OF TWO-DIMENSIONAL IMAGES FROM A THREE-DIMENSIONAL MODEL

CROSS REFERENCE TO RELATED APPLICATIONS

This application claims the benefit of priority to U.S. Provisional Patent Application No. 62/856,139, entitled "Parameterized Generation of Two-Dimensional Images from a Three-Dimensional Model," and filed on Jun. 2, 2019, the disclosure of which is hereby incorporated herein in its entirety.

TECHNICAL FIELD

The present description relates generally to generating two-dimensional images from three-dimensional models, including parameterized generation of two-dimensional images from three-dimensional models.

BACKGROUND

Users may use messaging applications to communicate with each other. The users may personalize their messages by adding particular images, which may be referred to as stickers and/or emoticons, for example. Users may also create three-dimensional representations or models of themselves, e.g., avatars, (and/or use pre-configured three-dimensional models) which may be used to further personalize messages and/or other types of communications.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
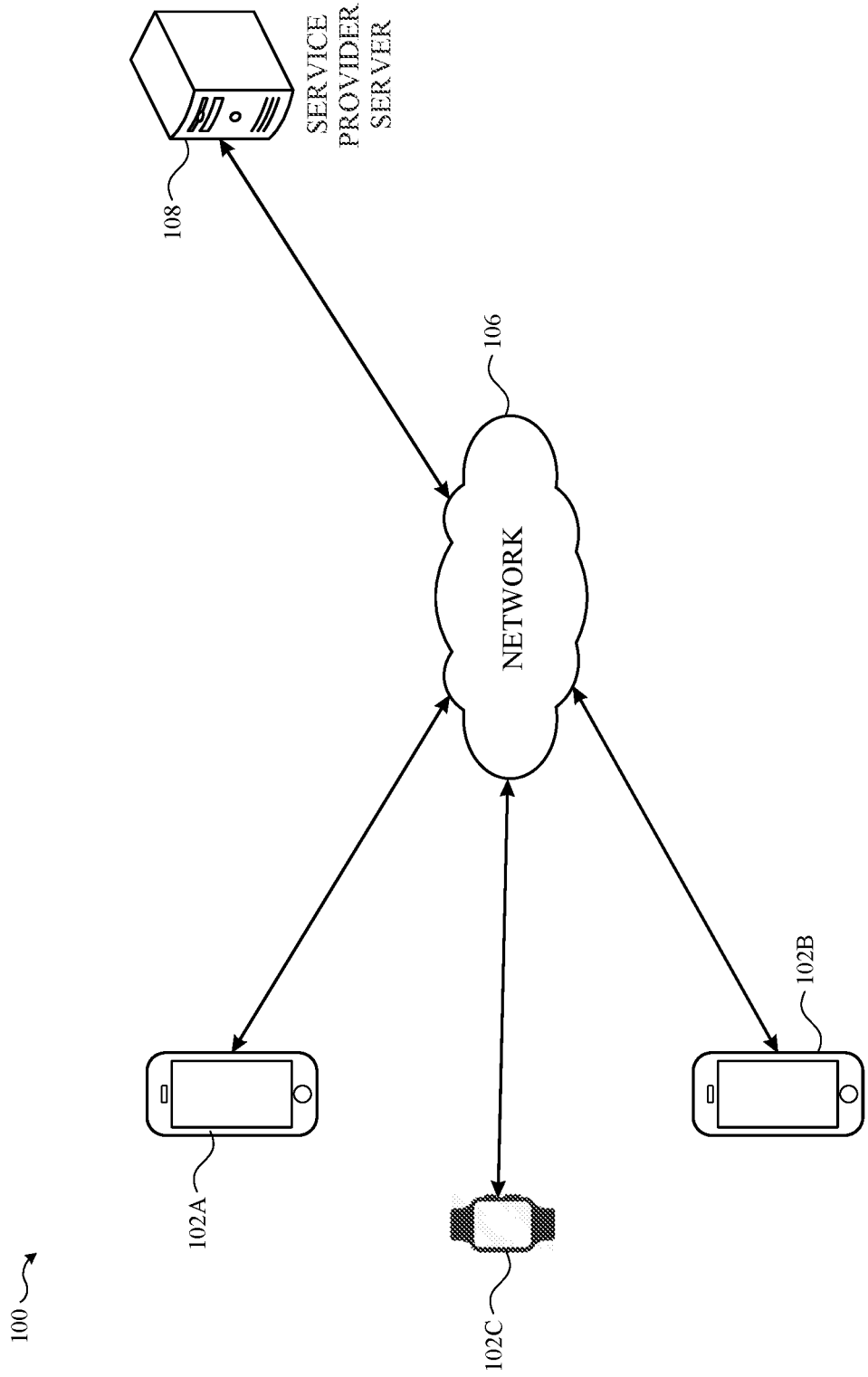
FIG. 1 illustrates an example network environment in which parameterized generation of two-dimensional images from a three-dimensional model may be implemented in accordance with one or more implementations.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Users may use two-dimensional images (e.g., stickers, emoticons, etc.) and/or three-dimensional models/representations (e.g., avatars) to customize/personalize messages and other content. For example, a user may create a three-dimensional model of themselves and may use the model to, e.g., communicate animated messages. Using face-tracking technology, the user may attempt to pose the three-dimensional model they created (or other three-dimensional models) to create particular images that may be used in messages or other content (e.g., as stickers). However, it may be difficult for users to create particular poses, and even with the particular poses the user may be unable to create enhanced (or rich) images from a posed three-dimensional model, e.g. images that include modifications to the three-dimensional model and/or that include supplemental content (such as props).

The subject system utilizes configuration files (e.g., including sets of parameters) to automatically create enhanced images (e.g., enhanced two-dimensional images) from the three-dimensional models that are stored on a user's electronic device. The configuration files may be created, for example, at a server that does not have access to the three-dimensional models stored on the user's electronic device. The configuration files may then be provided to the user's electronic device, and the electronic device may generate the enhanced images from the three-dimensional models based on the sets of parameters. Thus, the subject system provides a user with access to enhanced images (e.g., available through a messaging application and/or a keyboard) that are generated from the three-dimensional models stored on the user's electronic device, while preserving the privacy of any three-dimensional models that may have been created and/or configured by the user, which may be personal in nature.

Furthermore, by generating the images on the user's electronic device (e.g., instead of at the server), the server only needs to transmit the configuration files to the user's electronic device, thereby conserving the amount of bandwidth needed by the electronic device to obtain the images. Similarly, since the images are generated at the user's electronic device, the user's electronic device can delete the images, e.g. to free disk space, and can then dynamically regenerate the images using the configuration files (which may occupy significantly less disk space than the images) when needed, e.g., the next time the user requests to access the enhanced images.

FIG. 1 illustrates an example network environment 100 in which parameterized generation of two-dimensional images from a three-dimensional model may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes one or more electronic devices 102A-C, a network 106, and a service provider server 108. The network 106 may communicatively (directly or indirectly) couple, for example, any two or more of the electronic devices 102A-C and/or the service provider server 108.

The network 106 may be an interconnected network of devices that may include, or may be communicatively coupled to, the Internet. The service provider server 108 may include one or more server devices and/or network equipment that facilitates providing one or more services to the electronic devices 102A-B over the network 106, such as a messaging service, a secure cloud storage service, and the like. In one or more implementations, one or more of the electronic devices 102A-C may be associated with and/or registered to a user account via the service provider server 108. The service provider server 108 may be, and/or may include all or part of, the electronic system discussed below with respect to FIG. 9.

One or more of the electronic devices 102A-C may be, for example, a portable computing device such as a laptop computer, a smartphone, a peripheral device (e.g., a digital camera, headphones), a tablet device, a smart speaker, a set-top box, a content streaming device, a wearable device such as a watch, a band, and the like, or any other appropriate device that includes one or more wireless interfaces, such as one or more near-field communication (NFC) radios, WLAN radios, Bluetooth radios, Zigbee radios, cellular radios, and/or other wireless radios. In FIG. 1, by way of example, the electronic devices 102A-B are depicted as mobile phones and the electronic device 102A is depicted as a smartwatch. One or more of the electronic devices 102A-C may be, and/or may include all or part of, the electronic device discussed below with respect to FIG. 2, and/or the electronic system discussed below with respect to FIG. 9.

One or more of the electronic devices 102A-C, such as the electronic device 102A may store one or more three-dimensional models that may be used, for example, to customize/personalize messages. For example, the electronic device 102A may include face-tracking technology that can generate a mesh of points that corresponds to the user's face. The mesh of points can be applied to one of the three-dimensional models to animate the model to coincide with the movement of the user's face. The electronic device 102A may also capture audio spoken by the user, the output of which may also be synchronized with the animation of the three-dimensional model, such that the three-dimensional model has the appearance of speaking in the same manner as the user.

The three-dimensional models stored on the electronic device 102A may include pre-configured three-dimensional models, e.g., in the form of an animal head and/or body, an alien head and/or body, etc., and/or the three-dimensional models stored on the electronic device 102A may include user-configured three-dimensional models, such as corresponding to the head of the user. The user-configured three-dimensional models may include a particular user-configured arrangement of components selected from a library of components, such as eyes, mouths, noses, hats, accessories, and the like.

The pre-configured and/or user-configured three-dimensional models may be stored on the electronic devices 102A-C as, and/or in conjunction with, a set of parameters, a configuration of a set of parameters, and/or a set of instructions for configuring a particular set of parameters, which may also be referred to as a recipe for a three-dimensional model. For example, in the case of a user-configured three-dimensional model, the set of parameters may indicate skin color, hair color, eye color, eye type, mouth type, accessory information, etc., or generally any information that can be used to render the three-dimensional model. The set of parameters and/or corresponding instructions can be used to render the model using one or more components/assets (e.g. graphical components) that may be locally stored and/or obtained at the electronic device 102A. In one or more implementations, the rendered three-dimensional models may be cached on the electronic device 102A and/or may be dynamically generated when requested.

In the subject system, the service provider server 108 may generate one or more configuration files that include sets of parameters that can be used by one or more of the electronic devices 102A-C, such as the electronic device 102A, to generate two-dimensional images from three-dimensional models that are stored on the electronic device 102A. In generating the configuration files, the service provider server 108 may have access to, and/or knowledge of, the library of components that may be used to configure/create user-configured three-dimensional models; however, the service provider server 108 may not have access to any particular user-configured three dimensional models that may have been configured and/or created on the electronic device 102A.

The electronic device 102A may use the one or more configuration files to generate a set of images for each (or any) of the three-dimensional models that are stored on the electronic device 102A. An example process of using the configuration files to generate a respective set of two-dimensional images from each three-dimensional model stored on the electronic device 102A is discussed further below with respect to FIG. 5.

The configuration files may include parameters that indicate rendering camera positions with respect to the three-dimensional models, particular poses (e.g. expressions) of the three-dimensional models, modifications to the three-dimensional models and/or supplemental content (e.g., two-dimensional and/or three-dimensional content, such as props) that may be added to the three-dimensional models to generate the two-dimensional images. Example rendering stages for generating the two-dimensional images are discussed further below with respect to FIGS. 3 and 6, and example parameters for a configuration file are discussed further below with respect to FIG. 4. Example two-dimensional images and corresponding three-dimensional models are discussed further below with respect to FIG. 7.

Once the electronic device 102A generates the two-dimensional images, the configuration files and the two-dimensional images may be locally stored on the electronic device 102A. Since the electronic device 102A can regenerate the two-dimensional images dynamically using the configuration files, the electronic device 102A may delete the two-dimensional images to free disk space, e.g. based on a caching policy.

The electronic device 102A may provide a user with access to the two-dimensional images via, e.g., a messaging application and/or a virtual keyboard (e.g., a keyboard application). Example two-dimensional images generated from three-dimensional models are discussed further below with respect to FIG. 8.

Figure 2:
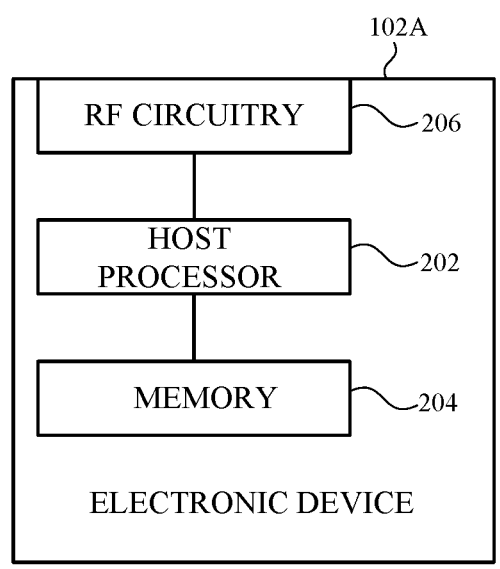
FIG. 2 illustrates an example electronic device that may perform parameterized generation of two-dimensional images from a three-dimensional model in accordance with one or more implementations.

FIG. 2 illustrates an example electronic device 102A that may perform parameterized generation of two-dimensional images from a three-dimensional model in accordance with one or more implementations. The electronic device 102A is depicted in FIG. 2 for explanatory purposes; however, one or more of the components of the electronic device 102A may also be implemented by one or more of the other electronic devices 102B-C. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The electronic device 102A may include a host processor 202, a memory 204, and radio frequency (RF) circuitry 206. The RF circuitry 206 may include one or more antennas and one or more transceivers for transmitting/receiving RF communications, such as WiFi, Bluetooth, cellular, and the like.

The host processor 202 may include suitable logic, circuitry, and/or code that enable processing data and/or controlling operations of the electronic device 102A. In this regard, the host processor 202 may be enabled to provide control signals to various other components of the electronic device 102A. Additionally, the host processor 202 may enable implementation of an operating system or may otherwise execute code to manage operations of the electronic device 102A.

The memory 204 may include suitable logic, circuitry, and/or code that enable storage of various types of information such as received data, generated data (such as three-dimensional models, two-dimensional images, configuration files, components/assets, and the like), code, and/or configuration information. The memory 204 may include, for example, random access memory (RAM), read-only memory (ROM), flash, and/or magnetic storage.

In one or more implementations, the host processors 202, and/or one or more portions thereof, may be implemented in software (e.g., subroutines and code), may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
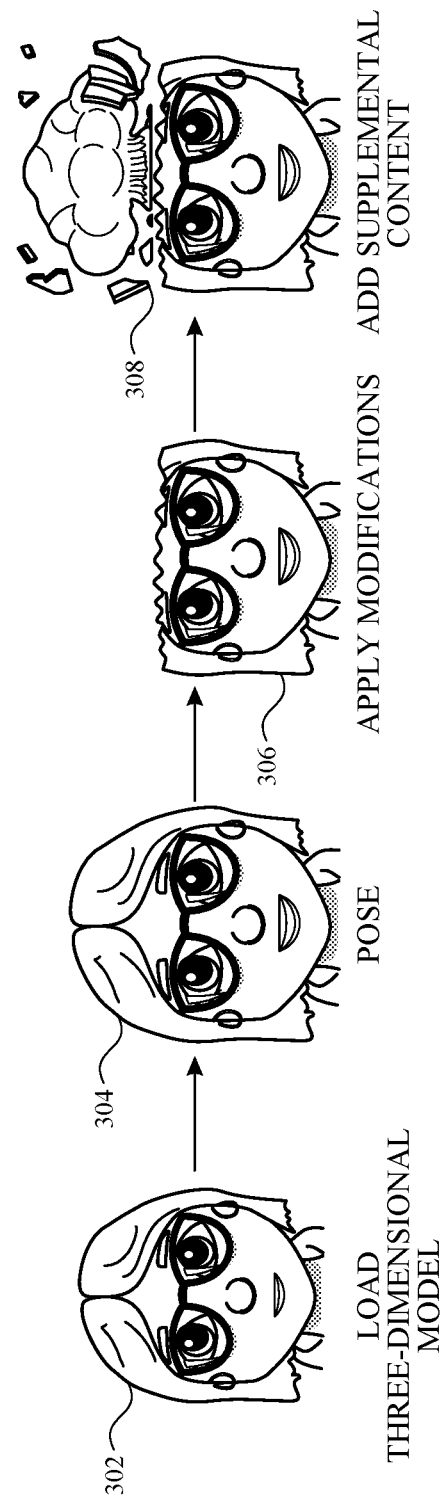
FIG. 3 illustrates example rendering stages of parameterized generation of a two-dimensional image from a three-dimensional model in accordance with one or more implementations.

FIG. 3 illustrates example rendering stages of parameterized generation of a two-dimensional image from a three-dimensional model in accordance with one or more implementations. Not all of the depicted rendering stages may be used in all implementations, however, and one or more implementations may include additional or different rendering stages than those shown in the figure. Variations in the arrangement and type of the rendering stages may be made without departing from the spirit or scope of the claims as set forth herein. Additional components, different components, or fewer components may be provided.

In the first rendering stage 302, the electronic device 102A retrieves and loads (e.g., renders) one of the locally stored three-dimensional models and the corresponding configuration file for generating the two-dimensional image(s). In the second rendering stage 304, the electronic device 102A poses the three-dimensional model and/or positions the render camera (e.g., used to generate the two-dimensional image), based at least in part on one or more parameters of the configuration file. For example, the configuration file may include one or more parameters that may pertain to different positioning of the mouth, the eyes, the ears, and/or any part/component of the three-dimensional model. In one or more implementations, the one or more parameters may indicate a preconfigured facial expression that may be applied by the electronic device 102A.

In the third rendering stage 306, the electronic device 102A may perform one or more modifications to the three-dimensional model, such as based at least in part on one or more parameters of the configuration file. The modifications may include removing one or more components from the three-dimensional model, such as a hat, glasses, etc., and/or graphically modifying and/or processing (e.g., re-rendering) the three-dimensional model. As shown in FIG. 3, the top portion of the three-dimensional model has been removed, with a fracture line across the forehead of the three-dimensional model. The configuration file may indicate, for example, a position where to apply the fracture line to the three-dimensional model and the electronic device 102A may utilize one or more shaders to effectuate the fracture line, e.g., and re-render the modified three-dimensional model.

In the fourth rendering stage 308, the electronic device 102A may add supplemental content to the three-dimensional model based at least in part on one or more parameters of the configuration file. The supplemental content may be two-dimensional and/or three-dimensional content. For example, the supplemental content may be a three-dimensional hand that is added at particular depth from the three-dimensional model, and/or the supplemental content may be a two-dimensional image that is overlaid onto the three-dimensional model. The supplemental content may be content that is provided to the electronic device 102A, such as by the service provider server 108 in conjunction with the configuration files, and/or the electronic device 102A may retrieve the supplemental content when needed, such as from a network location. In one or more implementations, the electronic device 102A may modify the supplemental content, such as to resize the supplemental content and/or to match one or more features of the supplemental content to the three-dimensional model (e.g., skin color).

After adding the supplemental content, the electronic device 102A may use the render camera to generate the two-dimensional image from the three-dimensional model. The render camera may be, for example, a virtual camera that can be placed at any position relative to the three-dimensional model (e.g., in virtual three-dimensional space) and can generate an image (e.g., a virtual image) of the three-dimensional model from the perspective of the placed position.

Figure 4:
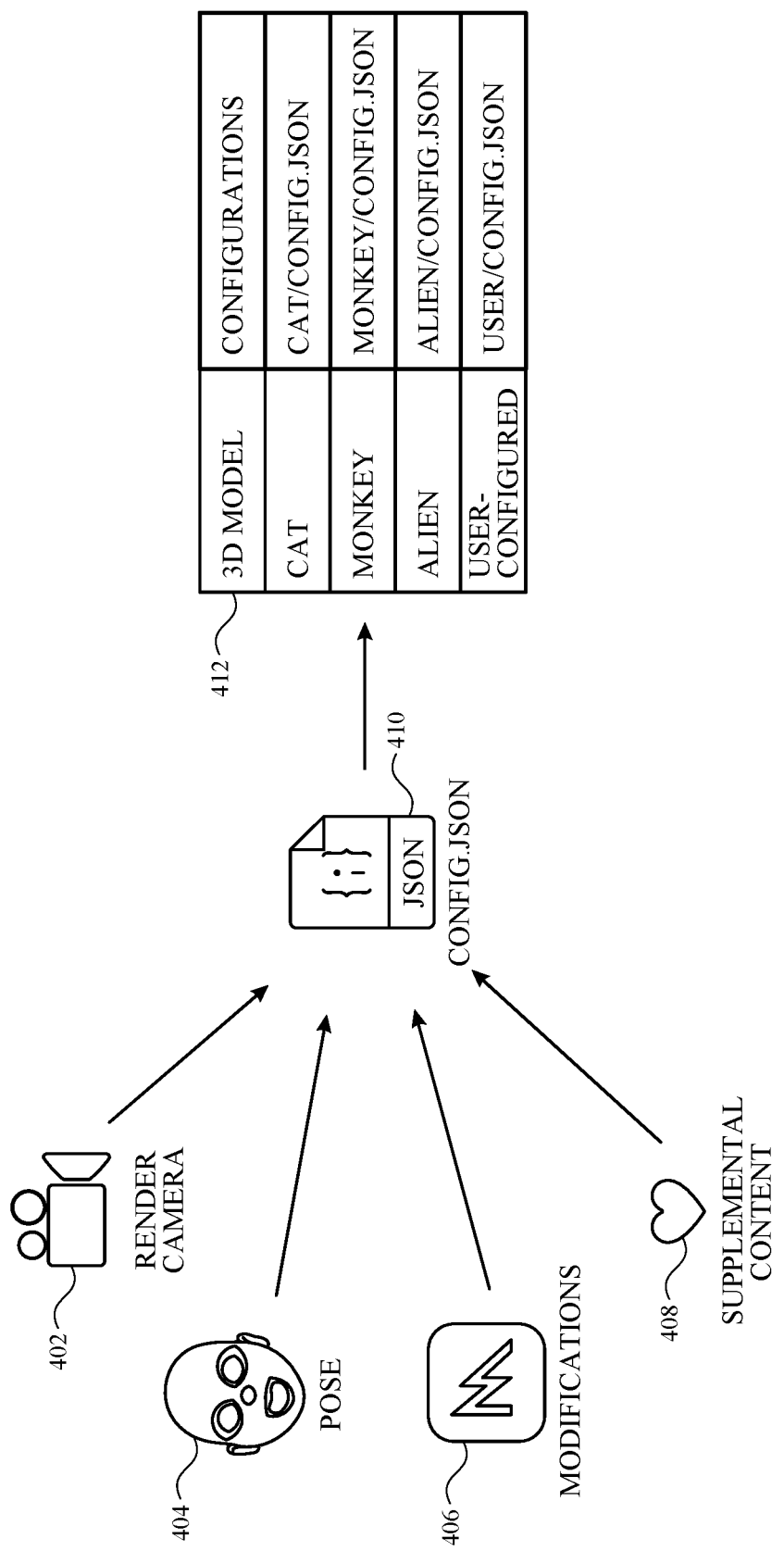
FIG. 4 illustrates examples of different parameters that may be stored in a configuration file in accordance with one or more implementations.

FIG. 4 illustrates examples of different parameters that may be stored in a configuration file in accordance with one or more implementations. Not all of the depicted parameters may be used in all implementations, however, and one or more implementations may include additional or different parameters than those shown in the figure. Variations in the arrangement and type of the parameters may be made without departing from the spirit or scope of the claims as set forth herein. Additional components, different components, or fewer components may be provided.

As shown in FIG. 4, a configuration file 410 may include one or more parameters 402 that describe the render camera position (e.g., relative to the three-dimensional model in a virtual three-dimensional space), one or more parameters 404 that describe the pose to be applied to the three-dimensional model, one or more parameters 406 that describe any modifications to the three-dimensional model, and one or more parameters 408 that describe any supplemental content to be added to the three-dimensional model.

In one or more implementations, the configuration file 410 may be a JavaScript Object Notation (JSON) file. The service provider server 108 may provide the electronic device 102A with a collection of configuration files 410, which may be stored in one or more file paths and/or directories that may be identified at the electronic device 102A from a table 412, and/or any other data structure.

In one or more implementations, the electronic device 102A may provide a graphical user interface that allows a user to create a configuration file 410. For example, the graphical user interface may display a selected three-dimensional model and allow the user to position the render camera, from which the one or more parameters 402 that describe the render camera position may be generated. The graphical user interface may also allow the user to pose the three-dimensional model, from which the one or more parameters 404 that describe the pose may be generated.

The graphical user interface may allow the user to modify the three-dimensional model, from which the one or more parameters 406 that describe the modifications may be generated. The graphical user interface may also allow the user to select and add one or more supplemental content items to particular locations on the three-dimensional model, from which the one or more parameters 408 that describe the supplemental content may be generated. The configuration file containing the parameters generated by the user, e.g., using the graphical user interface, may be saved on the electronic device 102A and may be used to generate a corresponding two-dimensional image. In one or more implementations, the electronic device 102A may also allow the user to share the configuration file, e.g., with one or more other users.

Figure 5:
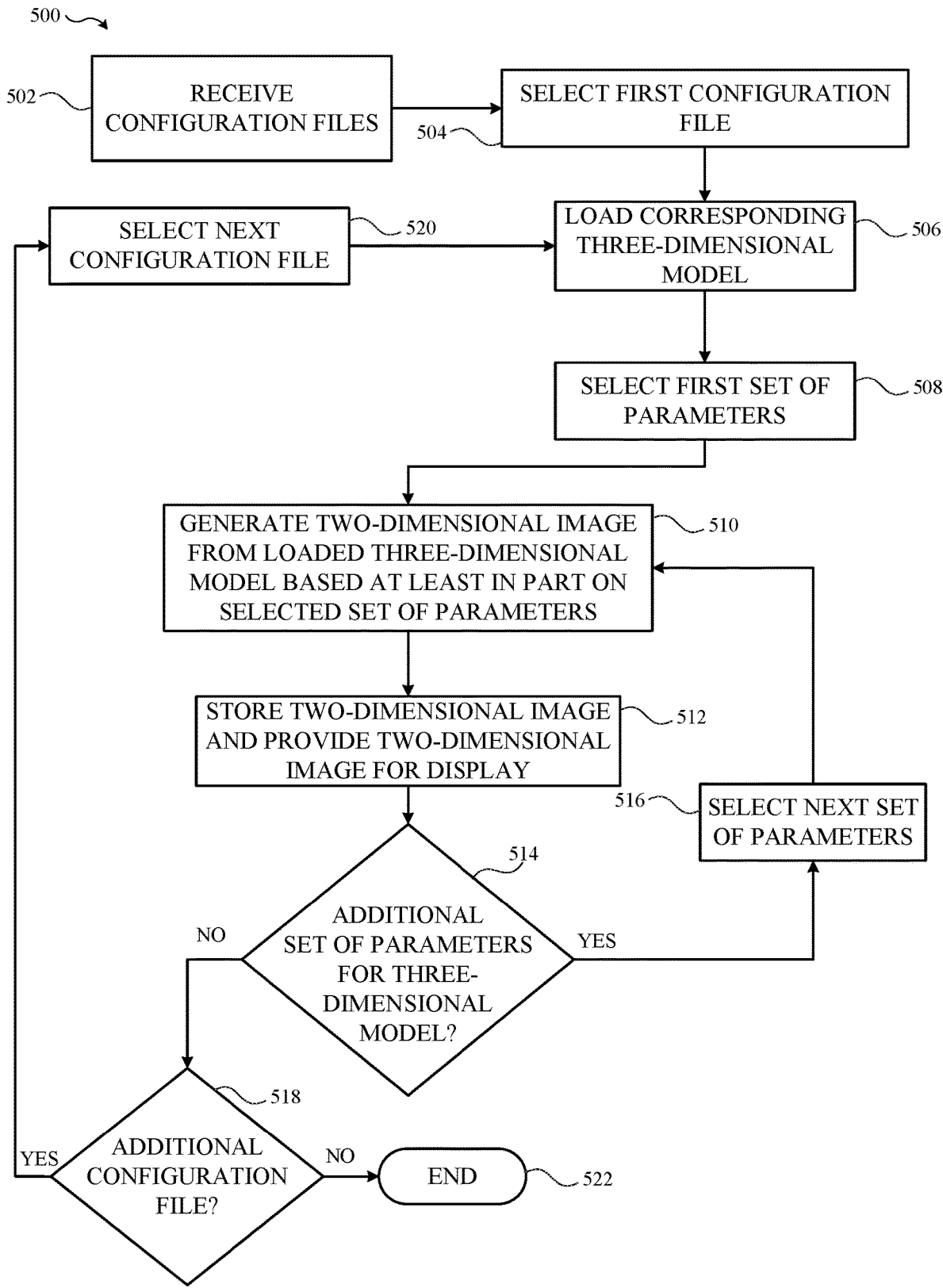
FIG. 5 illustrates a flow diagram of an example process of parameterized generation of respective sets of two-dimensional images from respective three-dimensional models of a set of three-dimensional models in accordance with one or more implementations.

FIG. 5 illustrates a flow diagram of an example process 500 of parameterized generation of respective sets of two-dimensional images from respective three-dimensional models of a set of three-dimensional models in accordance with one or more implementations. For explanatory purposes, the process 500 is primarily described herein with reference to the electronic device 102A of FIGS. 1-2. However, the electronic device 102A is presented as an exemplary device and the operations described herein may be performed by any suitable devices, such as the other electronic devices 102B-C. Further, for explanatory purposes, the operations of the process 500 are described herein as occurring in serial, or linearly. However, multiple operations of the process 500 may occur in parallel, such that they at least partially overlap in time. In addition, the operations of the process 500 need not be performed in the order shown and/or one or more of the operations of the process 500 need not be performed and/or can be replaced by other operations.

The process 500 begins when the electronic device 102A receives one or more configuration files, such as from the service provider server 108 (502). For example, the service provider server 108 may provide the configuration files to the electronic device 102A as part of a software update, such as an operating system update and/or a messaging application update, the service provider server 108 may push the configuration files to the electronic device 102A, and/or the service provider server 108 may notify the electronic device 102A that the configuration files are available for retrieval.

The electronic device 102A may select the first configuration file (504). The selection of the first configuration file (504) may occur asynchronously with receiving the configuration files (502). For example, the electronic device 102A may select the first configuration file (504) during a downtime for the electronic device 102A, such as at night, or the electronic device 102A may select the first configuration file responsive to the user requesting to access one or more of the two-dimensional images (when they have not yet been generated and/or have been deleted).

The electronic device 102A loads the three-dimensional model corresponding to the selected configuration file (506), and the electronic device 102A selects the first set of parameters from the configuration file (508), which may correspond to the first two-dimensional images to be generated from the three-dimensional model. The electronic device 102A performs the rendering stages 302-308 and generates the two-dimensional image from the three-dimensional model based at least in part on the selected set of parameters (510). An example process of parameterized generation of the two-dimensional image from the three-dimensional model is discussed further below with respect to FIG. 6.

The electronic device 102A stores the two-dimensional image, such as in memory, and/or provides the two-dimensional image for display (512). For example, if the user has requested the two-dimensional images, such as by selecting a particular keyboard option and/or requesting the two-dimensional images via the messaging application, the electronic device 102A may immediately display the two-dimensional images as soon as they are generated.

The electronic device 102A may be able to generate the two-dimensional images sufficiently quickly enough that it may be imperceptible to the user that the two-dimensional images are being dynamically generated, e.g., being generated on the fly. However, in one or more implementations, the electronic device 102A may display placeholder images in place of the two-dimensional images while the two-dimensional images are being generated. The placeholder images may have the same outline as the representation of the three-dimensional model in the two-dimensional images. Thus, there may be a visually smooth transition from the placeholder images to the generated two-dimensional images. In one or more implementations, the placeholder images may be rendered/generated by the electronic device 102A, such as after posing the three-dimensional models, and/or the placeholder images may be provided by the service provider server 108.

The electronic device 102A determines whether there is an additional set of parameters in the configuration file for the loaded three-dimensional model (514). For example, the electronic device 102A may determine whether there is an additional two-dimensional image to generate for the three-dimensional model. If the electronic device 102A determines that there is an additional set of parameters for the loaded three-dimensional model (514), the electronic device 102A selects the next set of parameters (516) and repeats operations (510)-(514).

If the electronic device 102A determines that there are no additional sets of parameters for the loaded three-dimensional model (514), the electronic device 102A determines whether there is an additional configuration file (518), e.g. corresponding to another three-dimensional model for which the two-dimensional images have not been generated. If the electronic device 102A determines that there is an additional configuration file (518), the electronic device 102A selects the next configuration file (520) and repeats operations (506)-(514). If the electronic device 102A determines that there are no additional configuration files (518), then all of the two-dimensional images have been generated and the process 500 ends (522).

Figure 6:
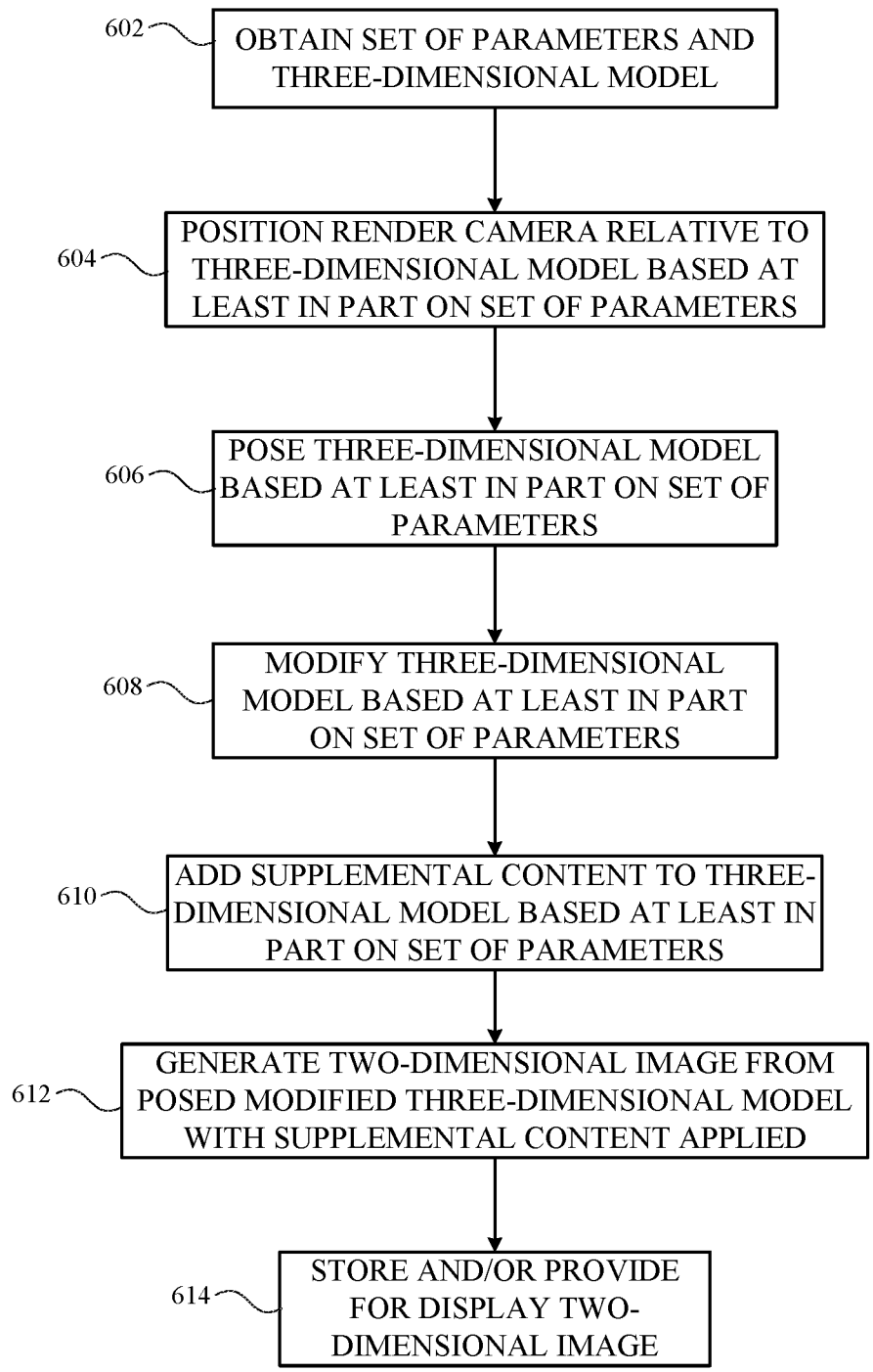
FIG. 6 illustrates a flow diagram of an example process of parameterized generation of a two-dimensional image from a three-dimensional model in accordance with one or more implementations.

FIG. 6 illustrates a flow diagram of an example process 600 of parameterized generation of a two-dimensional image from a three-dimensional model in accordance with one or more implementations. For explanatory purposes, the process 600 is primarily described herein with reference to the electronic device 102A of FIGS. 1-2. However, the electronic device 102A is presented as an exemplary device and the operations described herein may be performed by any suitable devices, such as the other electronic devices 102B-C. Further, for explanatory purposes, the operations of the process 600 are described herein as occurring in serial, or linearly. However, multiple operations of the process 600 may occur in parallel, such that they at least partially overlap in time. In addition, the operations of the process 600 need not be performed in the order shown and/or one or more of the operations of the process 600 need not be performed and/or can be replaced by other operations.

The process 600 may be initiated by the electronic device 102A, for example, as part of the process 500 described above for generating all of the two-dimensional images from the three-dimensional models that are stored on the electronic device 102A. In one or more implementations, the electronic device 102A may initiate the process 600 to re-generate a two-dimensional image, such as when a user requests the two-dimensional image after it has been deleted, e.g. based on a caching policy.

The electronic device 102A obtains a set of parameters (e.g., from a configuration file) and loads the corresponding three-dimensional model (602). The electronic device 102A positions the render camera relative to the three-dimensional model based at least in part on the set of parameters (604), such as based at least in part on a first parameter of the set of parameters. For example, the set of parameters may indicate a particular depth or distance from the three-dimensional model to position the render camera, and/or the set of parameters may include three-dimensional coordinates, e.g. in a three-dimensional virtual space in which the three-dimensional model is the center (e.g., centered at (0, 0, 0)).

The electronic device 102A poses the three-dimensional model based at least in part on the set of parameters (606), such as based at least in part on a second parameter of the set of parameters. For example, the set of parameters may indicate a particular angle and/or orientation to move/rotate the three-dimensional model, and/or the set of parameters may indicate one or more positions of facial components of the three-dimensional model, such as eyes, eyebrows, mouth, nose, etc. In one or more implementations, the set of parameters may indicate a particular facial expression that is applied to the three-dimensional model.

The electronic device 102A modifies the three-dimensional model based at least in part on the set of parameters (608), such as based at least in part on a third parameter of the set of parameters. The modification may include, for example, removing one or more components from the three-dimensional model, such as a hat, eyebrows, glasses, etc., and/or changing the shape of the three-dimensional model itself (e.g., the aforementioned fracture line).

In one or more implementations, the set of parameters for performing the modification to a user-configured three-dimensional model may be conditional, e.g. since the service provider server 108 cannot access the user-configured three-dimensional models that are stored on the electronic device 102A. For example, the set of parameters may indicate that certain types of components, e.g. one type of accessory, should be removed but other types of components, e.g. another type of accessory, should not be removed. In one or more implementations, if the set of parameters does not include a modification to the three-dimensional model, then no modification may be performed.

The electronic device 102A may add supplemental content to a particular position/location on the three-dimensional model based at least in part on the set of parameters (610), e.g. based at least in part on a fourth parameter of the set of parameters. The supplemental content may be, for example, props or accessories that may enhance the two-dimensional image. Example supplemental content is discussed further below with respect to FIG. 8.

In one or more implementations, the electronic device 102A may modify the supplemental content before and/or after adding the supplemental content to the three-dimensional model, e.g., based at least in part on the set of parameters and/or characteristics of the three-dimensional model. For example, the electronic device 102A may change the size, color, or any other characteristic such that the supplemental content matches the three-dimensional model.

The electronic device 102A then generates the two-dimensional image from the posed and modified three-dimensional model with the supplemental content applied (612), such as using the positioned render camera. For example, the electronic device 102A may render a two-dimensional image (e.g., a raster image) of the three-dimensional model from the position of the render camera relative to the three-dimensional model. The electronic device 102A may store, and/or provide for display, the generated two-dimensional image (614). For example, if the two-dimensional image is being generated responsive to a user request therefore, the two-dimensional image (e.g., or a thumbnail thereof) may be immediately displayed to the user once generated.

In one or more implementations, the posed and modified three-dimensional model with the supplemental content added may be made accessible by the electronic device 102A to the user, e.g., independent of the two-dimensional image. Thus, the user may access and/or use the posed and modified three-dimensional model with the supplemental content added like any other three-dimensional model.

Figure 7:
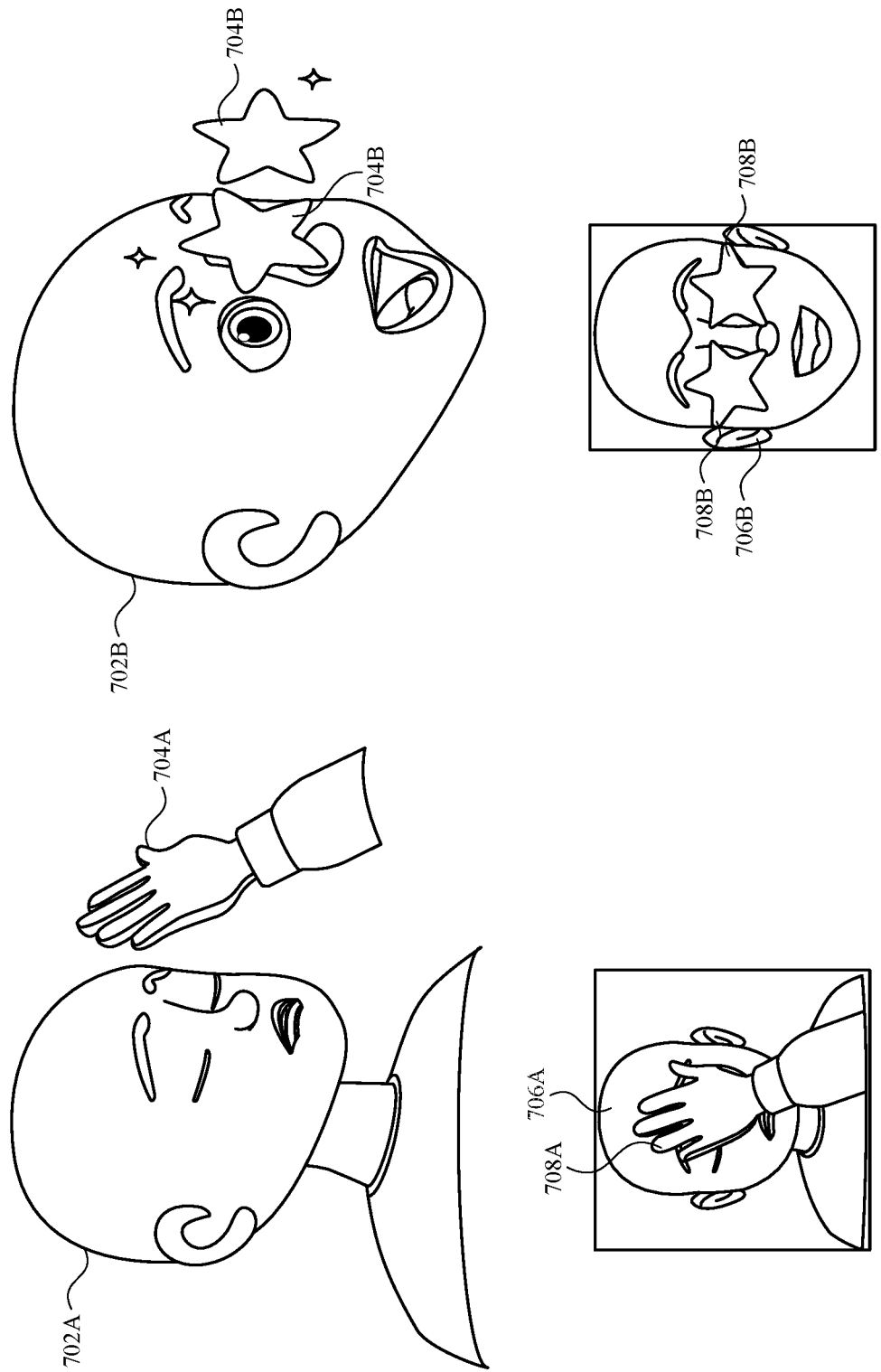
FIG. 7 illustrates example three-dimensional models and example two-dimensional images generated from the three-dimensional models in accordance with one or more implementations.

FIG. 7 illustrates example three-dimensional models 702A-B and example two-dimensional images 706A-B generated from the three-dimensional models in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As shown in FIG. 7, supplemental content 704A-B has been added to the three-dimensional models 702A-B, respectively. The supplemental content 704A has been positioned a certain distance from the three-dimensional model 702A, and the supplemental content 704B has been positioned a certain different distance from the three-dimensional model 702B.

The two-dimensional images 706A-B include two-dimensional versions of the supplemental content 708A-B. The two-dimensional images 706A-B illustrate the effect of adding three-dimensional supplemental content in the three-dimensional space. However, in one or more implementations, two-dimensional supplemental content may be added to one or more of the three-dimensional models 702A-B.

Figure 8:
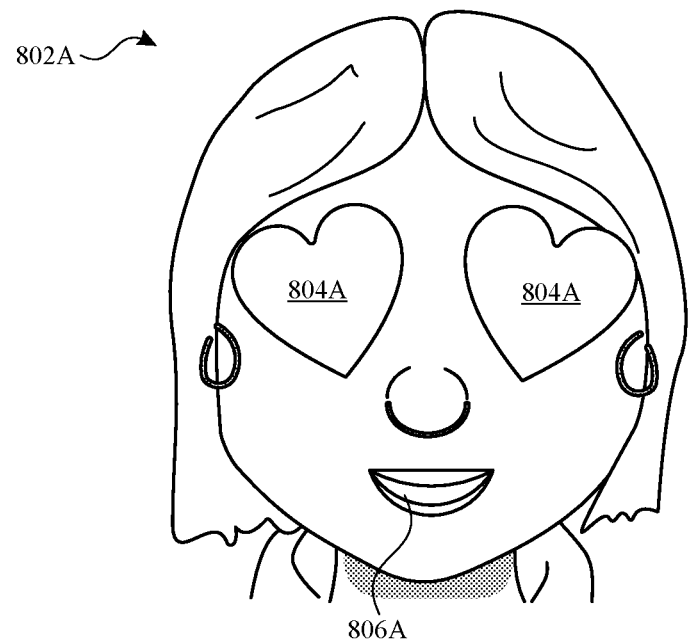
FIG. 8 illustrates example two-dimensional images generated from three-dimensional models in accordance with one or more implementations.
Figure 8:
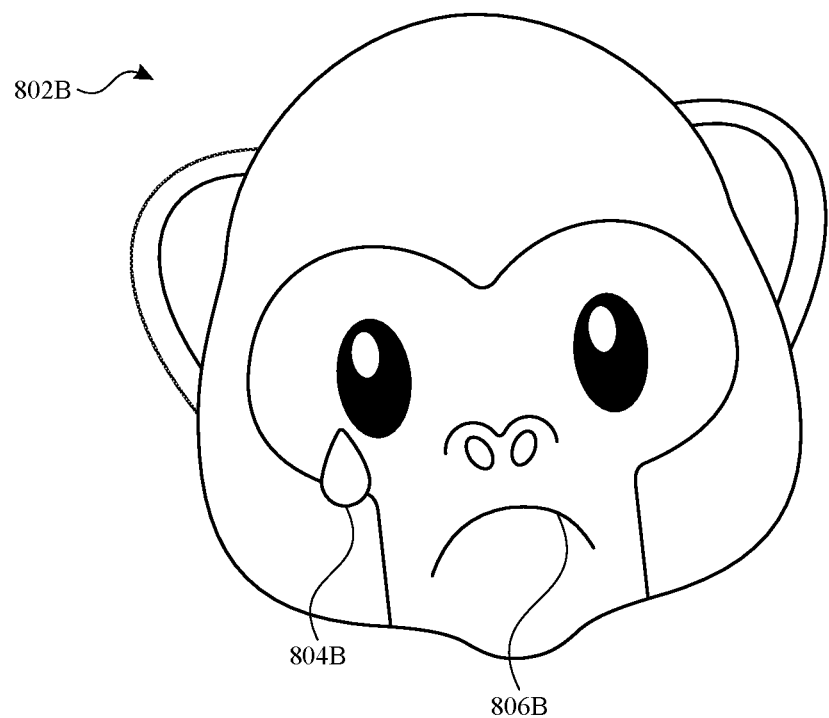

FIG. 8 illustrates example two-dimensional images 802A-B generated from three-dimensional models in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The two-dimensional images 802A-B include supplemental content 804A-B, and illustrate different poses 806A-B. For example, supplemental content 804A in the form of hearts is included in the two-dimensional image 802A, while supplemental content 804B in the form of a teardrop has been added to the two-dimensional image 802B. Similarly, the two-dimensional image 802A includes a pose 806A in the form of a smile, while the two-dimensional image 802B includes a pose 806B in the form of a frown.

In one or more implementations, the two-dimensional images 802A-B may be animated. For example, the supplemental content 804A-B may move, and/or any other animation may be applied to the two-dimensional images 802A-B. The animation may be a loop where, e.g., a preconfigured number of image frames are repeated.

Figure 9:
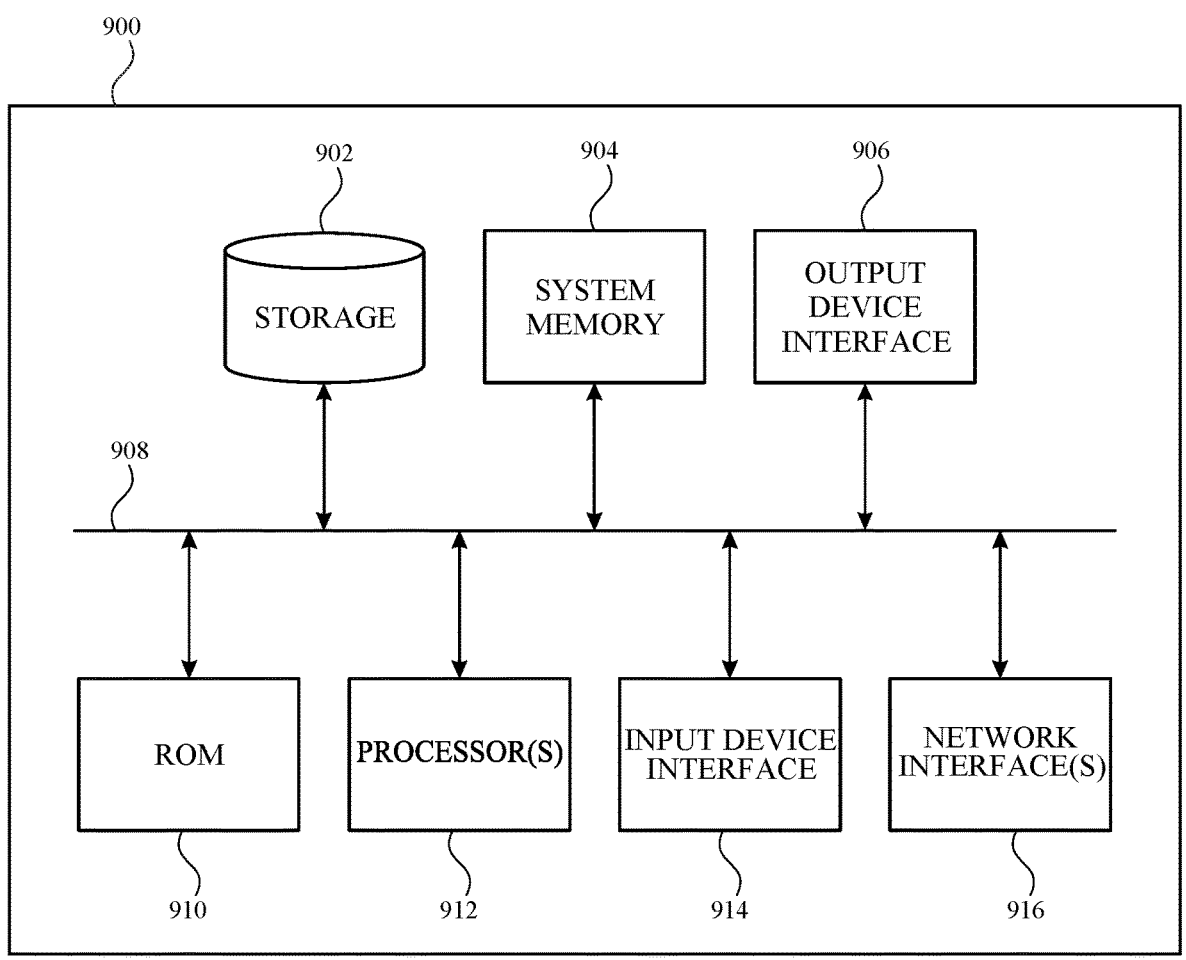
FIG. 9 conceptually illustrates an example electronic system with which aspects of the subject technology may be implemented in accordance with one or more implementations.

FIG. 9 conceptually illustrates an electronic system 900 with which one or more implementations of the subject technology may be implemented. The electronic system 900 can be, and/or can be a part of, one or more of the electronic devices 102A-C, and/or the service provider server 108 shown in FIG. 1. The electronic system 900 may include various types of computer readable media and interfaces for various other types of computer readable media. The electronic system 900 includes a bus 908, one or more processing unit(s) 912, a system memory 904 (and/or buffer), a ROM 910, a permanent storage device 902, an input device interface 914, an output device interface 906, and one or more network interfaces 916, or subsets and variations thereof.

The bus 908 collectively represents all system, peripheral, and chipset buses that communicatively connect the numerous internal devices of the electronic system 900. In one or more implementations, the bus 908 communicatively connects the one or more processing unit(s) 912 with the ROM 910, the system memory 904, and the permanent storage device 902. From these various memory units, the one or more processing unit(s) 912 retrieves instructions to execute and data to process in order to execute the processes of the subject disclosure. The one or more processing unit(s) 912 can be a single processor or a multi-core processor in different implementations.

The ROM 910 stores static data and instructions that are needed by the one or more processing unit(s) 912 and other modules of the electronic system 900. The permanent storage device 902, on the other hand, may be a read-and-write memory device. The permanent storage device 902 may be a non-volatile memory unit that stores instructions and data even when the electronic system 900 is off. In one or more implementations, a mass-storage device (such as a magnetic or optical disk and its corresponding disk drive) may be used as the permanent storage device 902.

In one or more implementations, a removable storage device (such as a floppy disk, flash drive, and its corresponding disk drive) may be used as the permanent storage device 902. Like the permanent storage device 902, the system memory 904 may be a read-and-write memory device. However, unlike the permanent storage device 902, the system memory 904 may be a volatile read-and-write memory, such as random access memory. The system memory 904 may store any of the instructions and data that one or more processing unit(s) 912 may need at runtime. In one or more implementations, the processes of the subject disclosure are stored in the system memory 904, the permanent storage device 902, and/or the ROM 910. From these various memory units, the one or more processing unit(s) 912 retrieves instructions to execute and data to process in order to execute the processes of one or more implementations.

The bus 908 also connects to the input and output device interfaces 914 and 906. The input device interface 914 enables a user to communicate information and select commands to the electronic system 900. Input devices that may be used with the input device interface 914 may include, for example, alphanumeric keyboards and pointing devices (also called "cursor control devices"). The output device interface 906 may enable, for example, the display of images generated by electronic system 900. Output devices that may be used with the output device interface 906 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 9, the bus 908 also couples the electronic system 900 to one or more networks and/or to one or more network nodes, through the one or more network interface(s) 916. In this manner, the electronic system 900 can be a part of a network of computers (such as a LAN, a wide area network ("WAN"), or an Intranet, or a network of networks, such as the Internet. Any or all components of the electronic system 900 can be used in conjunction with the subject disclosure.

As described above, one aspect of the present technology is the gathering and use of data available from specific and legitimate sources to improve image generation. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to select/suggest three-dimensional models in accordance with a user's preferences. Accordingly, use of such personal information data enables users to have greater control of the user-configured three-dimensional models. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of parameterized generation of two-dimensional images from three-dimensional models, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, parameterized generation of two-dimensional images from three-dimensional models can be performed based on aggregated non-personal information data or a bare minimum amount of personal information, such as the information being handled only on the user's device or other non-personal information available.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method comprising:
   receiving, by a device and from a server, a configuration file comprising at least a set of parameters for modifying a three-dimensional model stored locally on the device;
   loading the three-dimensional model in a three-dimensional space;
   selecting a first set of parameters from the at least the set of parameters of configuration file;
   after selecting the first set of parameters:
     positioning a render camera in the three-dimensional space relative to the loaded three-dimensional model based at least in part on a first parameter of the selected first set of parameters;

applying a pose to the loaded three-dimensional model based at least in part on a second parameter of the selected first set of parameters;

adding at least one supplemental content item to a particular location on the posed loaded three-dimensional model based at least in part on a third parameter of the selected set of parameters;

generating, using the positioned render camera, a two-dimensional image from the posed loaded three-dimensional model including the added at least one supplemental content item;

selecting a second set of parameters from the configuration file and repeating the positioning, applying, adding, and generating using the selected second set of parameters to generate another two-dimensional image from the loaded three-dimensional model; and storing the two-dimensional image and the other two-dimensional image generated from the loaded three-dimensional model.

2. The method of claim 1, wherein the three-dimensional model comprises a plurality of components, and the method further comprises:

removing, based at least in part on a fourth parameter of the first set of parameters, at least one of the plurality of components from the loaded three-dimensional model prior to adding the at least one supplemental content item to the particular location on the posed loaded three-dimensional model.

3. The method of claim 1, wherein the three-dimensional model comprises a plurality of components, and the method further comprises:

modifying, based at least in part on a fourth parameter of the first set of parameters and on at least one of the components of the plurality of components, the at least one supplemental content item prior to adding the at least one supplemental content item to the particular location on the posed and loaded three-dimensional model.

4. The method of claim 3, wherein modifying the at least one supplemental content item comprises modifying a color of the at least one supplemental content item.

5. The method of claim 3, wherein modifying the at least one supplemental content item comprises changing a size of the at least one supplemental content item.

6. The method of claim 1, further comprising:
identifying another three-dimensional model;
in response to identifying the other three-dimensional model:
retrieving the configuration file from a memory;
loading the other three-dimensional model;
positioning the render camera relative to the loaded other three-dimensional model based at least in part on the first parameter of the first set of parameters in the configuration file;
applying the pose to the loaded other changed dimensional model based at least in part on the second parameter of the first set of parameters in the configuration file;
adding the at least one supplemental content item to the posed loaded other three-dimensional model based at least in part on the third parameter of the first set of parameters in the configuration file;
generating, using the positioned render camera, another two-dimensional image from the posed loaded other three-dimensional model including the added at least one supplemental content item; and
storing the generated other two-dimensional image.

7. The method of claim 1, wherein the three-dimensional model is user configurable.

8. The method of claim 7, wherein the configuration file is received from a server and the three-dimensional model is inaccessible to the server.

9. The method of claim 1, further comprising:
providing access to the two-dimensional image via at least one of a keyboard or a messaging application.

10. The method of claim 1, wherein the three-dimensional model comprises facial features of at least one of a person or an animal.

11. The method of claim 10, wherein applying the pose to the loaded three-dimensional model based at least in part on a second parameter of the first set of parameters in the configuration file comprises:
modifying a facial expression of the loaded three-dimensional model.

12. The method of claim 1, further comprising:
storing the configuration file and the two-dimensional image in a memory; and
removing, based at least in part on a caching policy, the two-dimensional image from the memory.

13. The method of claim 12, further comprising:
in response to receiving a request for the two-dimensional image after having removed the two-dimensional image from the memory:
retrieving the configuration file from a memory;
positioning the render camera relative to the loaded three-dimensional model based at least in part on the first parameter of the first set of parameters in the configuration file;
applying the pose to the loaded three-dimensional model based at least in part on the second parameter of the first set of parameters in the configuration file;
adding the at least one supplemental content item to the posed loaded three-dimensional model based at least in part on the third parameter of the first set of parameters in the configuration file;
re-generating, using the positioned render camera, the two-dimensional image from the posed loaded three-dimensional model including the added at least one supplemental content item; and
storing the re-generated two-dimensional image.

14. A device comprising:
a memory; and
at least one processor configured to:
receive, by a device and from a server, a plurality of sets of parameters for modify a three-dimensional model stored locally on the device, where the three-dimensional model is inaccessible to the server;
load, in a three-dimensional space, the three-dimensional model;
select, based at least in part on a first set of parameters of the received plurality of sets of parameters, at least one supplemental content item to apply to the loaded three-dimensional model;
modify, based at least in part on the first set of parameters, at least one of the supplemental content item or the loaded three-dimensional model;
responsive to the modifying, apply the supplemental content item to the loaded three-dimensional model at a position determined based at least in part on the first set of parameters;
generate a first image from the loaded three-dimensional model with the supplemental content item applied;
store the first image in the memory;

repeat the load, select, modify and apply based at least in part on a second set of parameters of the received plurality of sets of parameters to generate a second image from the loaded three-dimensional model; and store the second image in the memory.

15. The device of claim 14, wherein the at least one processor is configured to modify, based at least in part on the first set of parameters, the at least one of the supplemental content item or the three-dimensional model by:
   removing at least a portion of the loaded three-dimensional model based at least in part on the set of parameters.

16. The device of claim 14, wherein the at least one processor is configured to modify, based at least in part on the first set of parameters, the at least one of the supplemental content item or the loaded three-dimensional model by:
   changing a first color of the at least one supplemental content item to match a second color of the loaded three-dimensional model.

17. A non-transitory machine-readable medium comprising code that, when executed by one or more processors, causes the one or more processors to perform operations, the code comprising:
   code to receive, from a server and by a device, a plurality of sets of parameters, each respective set of parameters for modifying one of a plurality of three-dimensional models that are locally stored at the device;
   for a first set of parameters of the received plurality of sets of parameters:
      code to render the one of the plurality of three-dimensional models in a three-dimensional space;
      code to position the rendered one of the plurality of three-dimensional models in the three-dimensional space relative to a render camera based at least in part on a first parameter of the first set of parameters;
      code to apply a pose to the positioned rendered one of the plurality of three-dimensional models based at least in part on a second parameter of the first set of parameters;
      code to apply at least one supplemental content item to the positioned, posed and rendered one of the plurality of three-dimensional models based at least in part a third parameter of the first set of parameters; and
      code to generate a first image from the positioned, posed, and rendered one of the plurality of three-dimensional models with the at least one supplemental content item applied;
      code to repeat the position, apply the pose, and apply the at least one supplemental content item based on a second set of parameters of the received plurality of parameters to generate a second image from the rendered at least one of the plurality of three-dimensional models; and
      code to store the first and second images generated from the rendered one of the plurality of three-dimensional models.

18. The non-transitory machine-readable medium of claim 17, wherein the one of the plurality of three-dimensional models comprises a user-selected subset of a plurality of components for the one of the plurality of three-dimensional models.

19. The non-transitory machine-readable medium of claim 18, wherein the plurality of components are accessible to the server and the user-selected subset of the plurality of components is indeterminable by the server.

20. The non-transitory machine-readable medium of claim 18, wherein the code further comprises:
   code to receive a user selection of the subset of the plurality of components for the one of the plurality of three-dimensional models.

* * * * *

UNITED STATES PATENT AND TRADEMARK OFFICE
CERTIFICATE OF CORRECTION

PATENT NO. : 12,039,661 B2
APPLICATION NO. : 16/889701
DATED : July 16, 2024
INVENTOR(S) : Jeffrey D. Harris et al.

Page 1 of 1

It is certified that error appears in the above-identified patent and that said Letters Patent is hereby corrected as shown below:

In the Claims

Column 17, Lines 55-56 (Claim 6): "changed dimensional model" should read --three-dimensional model--;

Column 18, Line 48 (Claim 14): "modify a three-dimensional" should read --modifying a three-dimensional--.

Signed and Sealed this
Seventeenth Day of September, 2024

Katherine Kelly Vidal
*Director of the United States Patent and Trademark Office*